United States Patent
Jiang et al.

(10) Patent No.: US 11,565,956 B2
(45) Date of Patent: Jan. 31, 2023

(54) MULTIFUNCTIONAL CONTINUOUS HYDROTHERMAL OXIDATION EXPERIMENT SYSTEM AND USE METHOD THEREFOR

(71) Applicant: JIANGSU INSTITUTE OF ENVIRONMENTAL SCIENCE, Nanjing (CN)

(72) Inventors: Weili Jiang, Nanjing (CN); Yanmeng Gong, Nanjing (CN); Jiaang Lu, Nanjing (CN); Shuyang Liu, Nanjing (CN)

(73) Assignee: JIANGSU INSTITUTE OF ENVIRONMENTAL SCIENCE, Nanjing (CN)

( * ) Notice: Subject to any disclaimer, the term of this patent is extended or adjusted under 35 U.S.C. 154(b) by 0 days.

(21) Appl. No.: 16/973,500

(22) PCT Filed: Oct. 18, 2019

(86) PCT No.: PCT/CN2019/111981
§ 371 (c)(1),
(2) Date: Dec. 9, 2020

(87) PCT Pub. No.: WO2020/093856
PCT Pub. Date: May 14, 2020

(65) Prior Publication Data
US 2021/0269337 A1    Sep. 2, 2021

(30) Foreign Application Priority Data
Nov. 9, 2018 (CN) .......................... 201811330537.9

(51) Int. Cl.
*C02F 1/02* (2006.01)
*C02F 1/72* (2006.01)

(52) U.S. Cl.
CPC ............. *C02F 1/725* (2013.01); *C02F 1/02* (2013.01); *C02F 1/722* (2013.01); *C02F 1/727* (2013.01);
(Continued)

(58) Field of Classification Search
CPC .. C02F 1/725; C02F 1/02; C02F 1/722; C02F 1/727; C02F 1/78; C02F 2201/005;
(Continued)

(56) References Cited

FOREIGN PATENT DOCUMENTS

| CN | 204251405 U | * | 4/2015 | |
| CN | 205643262 U | * | 10/2016 | |
| CN | 106082426 A | * | 11/2016 | ................ C02F 1/04 |
| CN | 106380021 A | * | 2/2017 | |

(Continued)

OTHER PUBLICATIONS

Machine generated English translation of JP-2017006856-A (Year: 2017).*

(Continued)

*Primary Examiner* — Magali P Slawski
*Assistant Examiner* — Bernadette Karen McGann
(74) *Attorney, Agent, or Firm* — CBM Patent Consulting, LLC (57) ABSTRACT

Disclosed is a multifunctional continuous hydrothermal oxidation experiment system, comprising a reactor (12), wherein an inlet of the reactor (12) is connected in parallel with an oxidant pipeline and a material pipeline; the oxidant pipeline comprises a gas oxidant delivery pipe and a liquid oxidant delivery pipe connected in parallel, and the gas oxidant pipe comprises an air oxidant delivery pipe and an oxygen delivery pipe connected in parallel; and a heat exchanger and a preheater are sequentially connected in series on the oxidant pipeline and the material pipeline, the oxidant pipeline and the material pipeline are in communication with an inner pipe of the heat exchanger; and the outlet of the reactor (12) is sequentially in communication, by means of piping, with a corrosion experiment device (14), an outer pipe of the heat exchanger, a cooler (16) and a gas-liquid separator (17).

8 Claims, 3 Drawing Sheets

(52) U.S. Cl.
CPC .... *C02F 2201/005* (2013.01); *C02F 2303/08* (2013.01); *C02F 2305/02* (2013.01)

(58) Field of Classification Search
CPC .............. C02F 2303/08; C02F 2305/02; C02F 2101/306; C02F 2101/308; C02F 2103/14; B01J 8/0278
See application file for complete search history.

(56) References Cited

FOREIGN PATENT DOCUMENTS

| | | | | | |
|---|---|---|---|---|---|
| CN | 107238566 | A | * | 10/2017 | ........... G01N 17/002 |
| CN | 108455719 | A | * | 8/2018 | |
| JP | 2017006856 | A | * | 1/2017 | |

OTHER PUBLICATIONS

Machine generated English translation of CN-106380021-A (Year: 2017).*
Machine generated English translation of CN-108455719-A (Year: 2018).*
Machine generated English translation of CN-204251405-U (Year: 2015).*
Machine generated English translation of CN-205643262-U (Year: 2016).*
Machine generated English translation of CN-107238566-A (Year: 2017).*
Machine generated English translation of CN-106082426-A (Year: 2016).*

* cited by examiner

FIG. 3

MULTIFUNCTIONAL CONTINUOUS HYDROTHERMAL OXIDATION EXPERIMENT SYSTEM AND USE METHOD THEREFOR

FIELD OF TECHNOLOGY

The invention relates to the hydrothermal oxidation technology, and in particular to a multifunctional continuous hydrothermal oxidation experiment system and a method of application therefor.

BACKGROUND

In recent decades, hydrothermal oxidation technology has been developed rapidly, and widely used in the treatment of high-concentration toxic and harmful wastewater produced by chemical, pesticide, printing and dyeing industries. Depending on the state inside the reactor during reaction, there exists states such as wet oxidation reaction and supercritical water oxidation reaction. In order to obtain the best treatment conditions, oxidant selection, reaction mechanism, product analysis, etc., it is necessary to carry out experiment research on wastewater with different water quality, which provides basic data and theoretical basis for the design of industrial devices.

Generally, hydrothermal oxidation experiment devices include intermittent and continuous experiment devices. Intermittent experiment device is seldom used because it takes a long time to heat and cool down, which is far from the real industrial devices. Continuous experiment device is more conducive to the simulation of the reaction process. However, the common continuous device only focuses on the realization of the hydrothermal oxidation process, and the functions of the experiment system are few, which are often limited to the control of temperature, flow rate, pressure and catalyst. There is no experiment system that can fully meet the requirements of oxidant screening, oxygen concentration analysis of inlet and outlet gas, multi-stream water inflow, and research on corrosion, temperature, flow rate, pressure, catalyst and other indicators during the reaction process, and make the experiment system closer to the real industrial treatment state.

Corrosion is an important factor limiting the industrial application of hydrothermal oxidation. The corrosion of reactors and pipe fittings varies with different materials, water quality and reaction conditions, so it is particularly important to conduct corrosion experiments in the early stage of industrial design. The common hydrothermal oxidation corrosion experiment is to put the experiment materials into the main reactor and take them out after the reaction to check the corrosion. Although this method is simple and convenient, it ignores the simulation of flush angle and bearing pressure and other properties, which greatly limits the reference value of wet oxidation corrosion experiments.

SUMMARY

In order to overcome the shortcomings of the above technical problems, the invention provides a multifunctional continuous hydrothermal oxidation experiment system, which can perform wet oxidation and supercritical water oxidation, and can effectively realize the functions of oxidant comparison, oxidant consumption analysis and corrosion experiment simulation under flowing condition. The invention also provides an operation method of the above system.

The multifunctional continuous hydrothermal oxidation experiment system according to the invention comprises a reactor, wherein an oxidant pipeline and a material pipeline are connected in parallel at an inlet of the reactor; the oxidant pipeline comprises gas oxidant delivery pipes and liquid oxidant delivery pipes which are connected in parallel, the gas oxidant delivery pipes comprise an air oxidant delivery pipe and an oxygen delivery pipe which are connected in parallel; a heat exchanger and a preheater are sequentially connected in series on the oxidant pipeline and the material pipeline, the oxidant pipeline and the material pipeline are communicated with an inner pipe of the heat exchanger, and the outlet of the reactor is sequentially communicated with a corrosion experiment device, an outer pipe of the heat exchanger, a cooler and a gas-liquid separator through a tube; a back pressure valve and a sampling valve are connected in series between the cooler and the gas-liquid separator; a gas outlet of the gas-liquid separator is connected in series with an oxygen concentration analyzer, a gas flowmeter and an off-gas collection device in sequence; a liquid outlet of the gas-liquid separator is connected with an effluent collection device.

Furthermore, a pneumatic booster and a gas mass flowmeter are sequentially connected in series on the gas oxidant delivery pipe, and an electric booster and an oxygen cylinder for introducing air are connected in parallel at the inlet of the pneumatic booster through the air delivery pipe and the oxygen delivery pipe, respectively.

A liquid storage tank and a pump are sequentially connected in series on both the liquid oxidant delivery pipe and the material delivery pipe.

Water enters the reactor from a bottom and exits from an upper part; the oxidant and materials enter the reactor through a perforated pipe, and a catalyst loading device is arranged in the reactor; the heating device outside the reactor is a tube furnace.

Furthermore, the corrosion experiment device is detachable and consists of an upper cover, a lower cover, and a middle cylindrical tube, and a plate to be tested is fixed in the middle cylindrical tube at an angle of 0°-90° with the water flow direction, so as to simulate the corrosion of the plate at different angles with the water flow.

The upper and lower covers and the middle cylindrical tube of the corrosion experiment device are sealed by threads, and the middle cylindrical tube can be replaced. The upper and lower covers are made of nickel-based alloy, and the middle cylindrical tube can be made of specified material according to the requirements of corrosion experiment. A bushing is arranged inside the corrosion experiment device to fix the angle of the plate to be tested.

The cooler is a cold shower. According to the design of conventional hydrothermal oxidation devices, the reactor inlet pipeline, the reactor outlet pipeline, and the preheater are all equipped with temperature indicators. Valves and pressure detectors are arranged on corresponding pipelines of the system.

More specifically, the multifunctional continuous hydrothermal oxidation experiment system according to the invention comprises a reactor, wherein an oxidant pipeline and a material pipeline are connected in parallel at the inlet of the reactor; The oxidant pipeline comprises a heat exchanger I and a preheater I; The outlet of the inner pipe of the heat exchanger I is communicated with the inlet of the preheater I, the inlet of the inner pipe of the heat exchanger I is connected in parallel with gas oxidant delivery pipes and liquid oxidant delivery pipes, wherein the gas oxidant delivery pipes comprise an air oxidant delivery pipe and an oxygen delivery pipe which are connected in parallel; The material pipeline comprises a heat exchanger II and a preheater II, wherein the outlet of the inner pipe of the heat exchanger II is communicated with the inlet of the preheater II, the inlet of the inner pipe of the heat exchanger II is communicated with a material delivery pipe; The outlet of the preheater I and the outlet of the preheater II are combined and then connected to the inlet of the reactor; The reactor is wrapped by a heating device outside; The outlet of the reactor is sequentially communicated with a corrosion experiment device, an outer tube of a heat exchange I, an outer tube of a heat exchanger II, a cooler and a gas-liquid separator through a tube.

Furthermore, a pneumatic booster and a gas mass flowmeter are sequentially connected in series on the gas oxidant delivery pipe, and an electric booster and an oxygen cylinder for introducing air are connected in parallel at an inlet of the pneumatic booster through the air delivery pipe and the oxygen delivery pipe, respectively.

The liquid oxidant delivery pipe is sequentially connected with a liquid storage tank I and a pump I in series; The material delivery pipe is sequentially connected with a liquid storage tank II and a pump II in series.

Furthermore, the system is provided with stop valves at the outlet of electric booster and oxygen cylinder, regulating valve at the outlet of starting booster, stop valves at the outlet of mass gas flowmeter, one-way valves at the outlets of pumps I and II, emptying stop valves at the bottom of heat exchanger I and II, emptying stop valves at the bottom of reactor, back pressure valve at the outlet of cooler, and sampling valve between the back pressure valve and the gas-liquid separator.

A method for using the multifunctional continuous hydrothermal oxidation experiment system according to the invention comprises the following steps:

(1) Commissioning and opening material pipelines: close the oxidant pipeline before the heat exchanger, adjust the pressure of the back pressure valve to 0 MPa, open the material pipeline to introduce clear water, close the sampling valve after water comes out of it, adjust the pressure of the material pipeline to the experiment pressure through the back pressure valve, open the reactor and introduce the solution to be treated;

(2) Opening oxidant pipelines: according to the type of experiment oxidant, choose to open the air oxidant delivery pipe, oxygen delivery pipe or liquid oxidant delivery pipe, after the reaction is stable, record the readings of gas flowmeter and oxygen concentration analyzer, open the sampling valve and continuously sample for detection;

(3) After the reaction, introduce clear water from the material pipeline and liquid oxidant pipeline, and turn off the preheater and the reactor, adjust the pressure of the back pressure valve to 0 MPa when the temperature in the reactor is lower than 100° C., and open the gas oxidant pipeline and the sampling valve when the temperature drops below 70° C., stop introducing clear water after the outlet water of the sampling valve is clear water, continue to blow and suck with gas for a while and close the gas oxidant pipeline after the reactor cools down to a room temperature, open the reactor and the corrosion experiment device, and remove the internal catalyst and corroded plate.

Preferably, in step (2), when the air oxidant delivery pipe or the oxygen delivery pipe is selected to be opened, the liquid oxidant can be mixed with the liquid to be treated and then introduced from the material pipeline, so as to realize reaction with simultaneous presence of gas and liquid oxidants.

The liquid oxidant is hydrogen peroxide, potassium nitrate or sodium nitrate solution.

Beneficial effects: The system according to the invention is provided with air pipes, oxygen pipes, liquid oxidant pipes, and material pipes in parallel. The liquid storage tank on the liquid oxidant pipes and the material pipes can be used as liquid oxidant storage tank, waste water tank or cleaning liquid tank according to practical requirements, and the oxidation performance of different kinds of gas oxidants or liquid oxidants in the continuous hydrothermal oxidation process can be compared; At the same time, the feeding speed of gas oxidant or liquid oxidant can be accurately controlled. A special detachable corrosion experiment device is arranged at the outlet of the reactor, which can simulate the corrosion of materials at different angles with the water flow direction under flowing condition. A gas mass flowmeter is provided at the outlet of gas booster, and an oxygen concentration analyzer and a gas flowmeter are provided at the front section of the off-gas collection device, which can accurately calculate the oxygen consumption during hydrothermal oxidation and monitor the oxygen concentration in the off-gas of the system as a safety control to prevent explosion hazards. The system is equipped with a heat exchanger, a preheater and a tube furnace, which can effectively recover the heat energy of the reaction effluent while ensuring that the temperature of the wastewater at the front, middle and end of the reactor is maintained at the set temperature.

BRIEF DESCRIPTION OF THE DRAWINGS

FIG. 3 is top views and corresponding schematic diagrams of longitudinal sections of the corrosion experiment device and the internal plate to be tested, in which, FIG. 3-1 shows the plate parallel to water flow, FIG. 3-2 shows the plate at 30 degrees with water flow, FIG. 3-3 shows the plate at 45 degrees opposite to water flow, and FIG. 3-4 shows the plate at 60 degrees with water flow.

DETAILED DESCRIPTION OF THE INVENTION

The application will be described in detail below in conjunction with specific embodiments.

Embodiment 1

Figure 1:
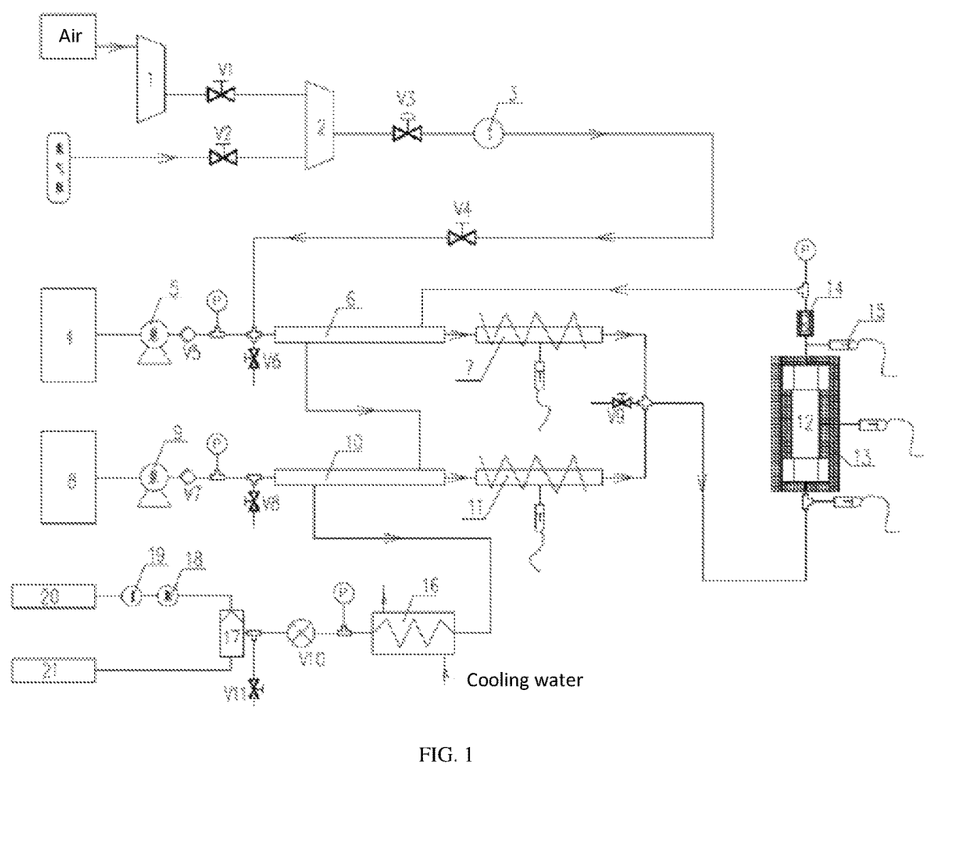
FIG. 1 is a schematic structural diagram of the multifunctional continuous hydrothermal oxidation experiment system of the invention.

As shown in FIG. 1, a multifunctional continuous hydrothermal oxidation experiment system comprises a reactor 12, an oxidant pipeline and a material pipeline are connected in parallel at the inlet of the reactor 12; The oxidant pipeline comprises gas oxidant delivery pipes and liquid oxidant delivery pipes connected in parallel, wherein the gas oxidant delivery pipes comprise an air oxidant delivery pipe and an oxygen delivery pipe connected in parallel; A heat exchanger and a preheater are sequentially connected in series on the oxidant pipeline and the material pipeline, the oxidant pipeline and the material pipeline are communicated with the inner pipe of the heat exchanger, and the outlet of the reactor 12 is sequentially communicated with a corrosion experiment device 14, an outer pipe of the heat exchanger, a cooler 16 and a gas-liquid separator 17 through ducts; Back pressure valve V10 and sampling valve V11 are connected in series between the cooler 16 and the gas-liquid separator 17; The gas outlet of the gas-liquid separator 17 is connected in series with an oxygen concentration analyzer 18, a gas flowmeter 19 and an off-gas collection device 20; The liquid outlet of the gas-liquid separator 17 is connected to the effluent collection device 21. A pneumatic booster 2 and a gas mass flowmeter 3 are sequentially connected in series on the gas oxidant delivery pipe, and an electric booster 1 and an oxygen cylinder for introducing air are connected in parallel at an inlet of the pneumatic booster 2 through the air delivery pipe and the oxygen delivery pipe, respectively.

Figure 3:
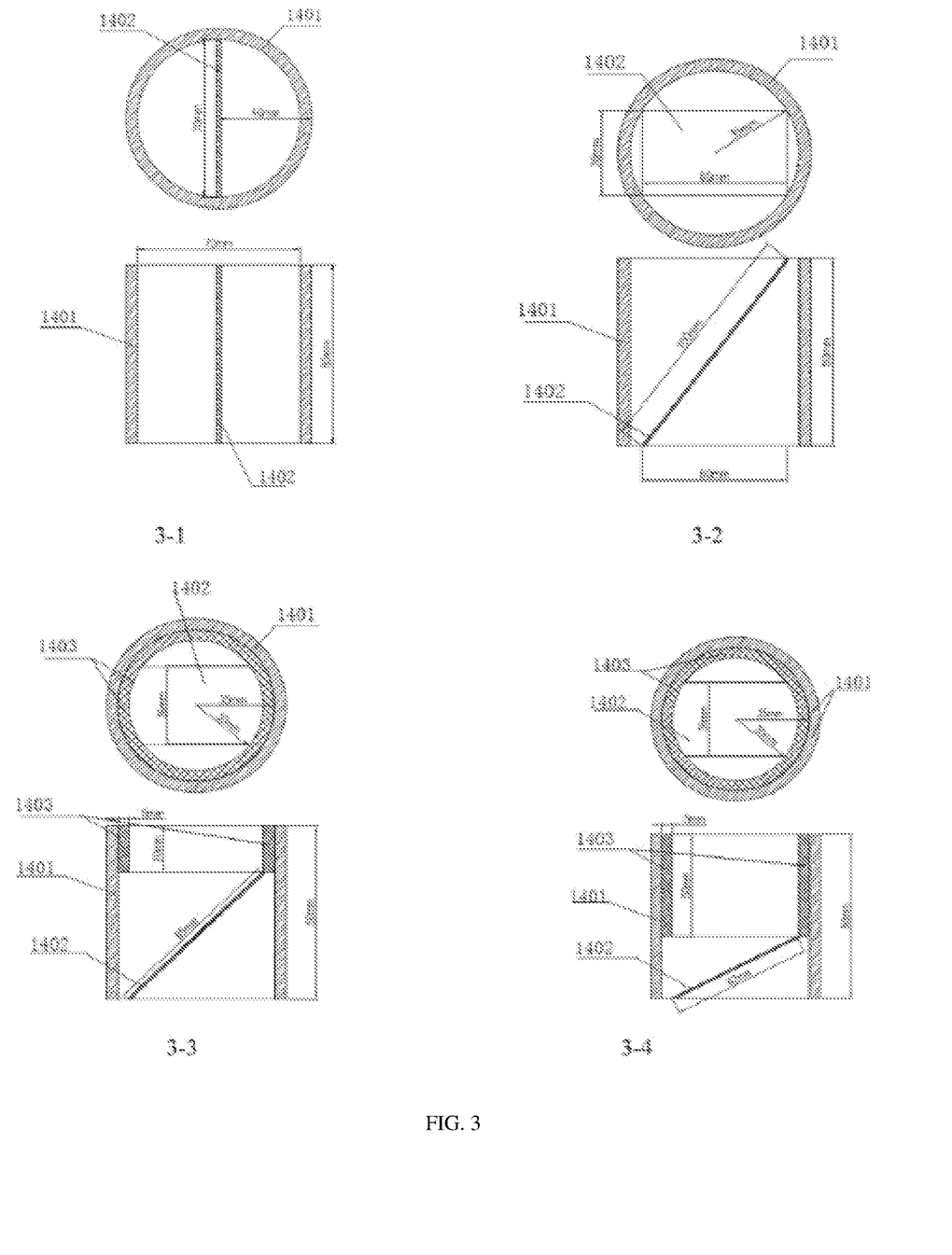

The experiment device shown in FIG. 1 comprises a gas oxidant pipeline, a liquid oxidant pipeline and a material pipeline; The liquid oxidant delivery pipe is connected in series with a liquid storage tank 14, a pump 15, a heat exchanger 16 and a preheater 17; The material delivery pipe is connected in series with a liquid storage tank 118, a pump 119, a heat exchanger I110 and a preheater I111; The inner pipe outlets of the preheaters 17 and I111 are all connected to the inlet of the reactor 12; Water enters the reactor 12 from the bottom and exits from the upper part; The oxidant and materials enter the reactor through a perforated pipe, and a catalyst loading device is arranged in the reactor; The heating device outside the reactor is a tube furnace 13. As shown in FIG. 3, the corrosion experiment device 14 is detachable and consists of an upper cover, a lower cover, and a middle cylindrical tube 1401, and a plate 1402 to be tested is fixed in the middle cylindrical tube 1401 at an angle of 0°-90° with the water flow direction, so as to simulate the corrosion of the plate at different angles with the water flow. The upper and lower covers of the corrosion experiment device and the middle cylindrical tube 1401 are sealed by threads, and the middle cylindrical tube 1401 can be replaced. The upper and lower covers are made of nickel-based alloy, and the middle cylindrical tube 1401 can be made of specified material according to the requirements of corrosion experiment. The corrosion experiment device is internally provided with a sleeve for fixing the angle of the plate 1402 to be tested. As shown in FIG. 3, the plate 1402 to be tested is fixed inside the corrosion experiment device 14 by a sleeve 1403, which is an elastic material sleeve with the same inner diameter as the middle cylindrical tube 1401 of the reactor as shown in FIG. 3. The cooler 16 is a cold shower.

Specifically, according to FIG. 1, the multifunctional continuous hydrothermal oxidation experiment system comprises an electric booster 1, a pneumatic booster 2, a gas mass flowmeter 3, a liquid storage tank 14, a pump IS, a heat exchanger 16, a preheater 17, a liquid storage tank 118, a pump 119, a heat exchanger I110, a preheater I111, a reactor 12, a tube furnace 13, a corrosion experiment device 14, temperature indicators 15, a cooler 16, a gas-liquid separator 17, an oxygen concentration analyzer 18, a gas flowmeter 19, an off-gas gas collection device 20, and an effluent collection device 21. Stop valves V1 and V2 are respectively arranged at the outlets of the electric booster 1 and the oxygen cylinder, a regulating valve V3 is arranged at the outlet of the pneumatic booster 2, a stop valve V4 is arranged at the outlet of the mass gas flowmeter 3, one-way valves V5 and V7 are respectively arranged at the outlets of the pump 15 and the pump 119, emptying stop valves V6 and V8 are respectively arranged at the bottom ends of heat exchanger 16 and heat exchanger I110, an emptying stop valve V9 is arranged at the bottom of reactor 12, a back pressure valve V10 is arranged at the outlet of the cold shower of cooler 16, and a sampling valve V11 is arranged between the back pressure valve V10 and the gas-liquid separator 17.

Figure 2:
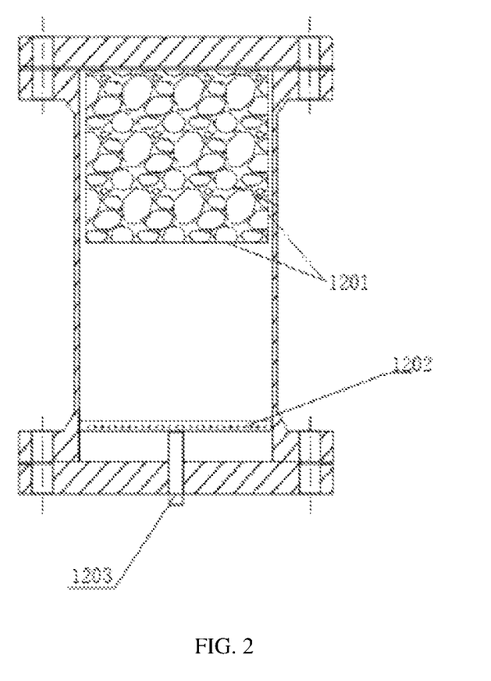
FIG. 2 is a schematic diagram of a longitudinal section of the reactor.

The inlet of the pneumatic booster 2 is divided into two branches: one is for air, the air is pressurized by the electric booster 1 and then enters the pneumatic booster 2 through the stop valve V1; The other is for oxygen, the oxygen cylinder is directly connected with the pneumatic booster 2 through the stop valve V2, and starts when the pneumatic booster 2 detects air intake. The electric booster 1 is a low-pressure booster with a pressure of 0.4 MPa-0.8 MPa, and the pneumatic booster 2 is a high-pressure booster with a pressure range of 8 MPa-30 MPa. As shown in FIG. 2, the reactor 12 is made of corrosion-resistant material, such as nickel-based alloy 625. A catalyst loading device 1201 made of nickel-based alloy material is arranged inside the reactor. A perforated pipe 1202 is arranged at the bottom of the reactor, and micropores are used for gas distribution. Materials and oxidant enter the reactor from the bottom through a reactor inlet pipe 1203. The exterior of the reactor is wrapped by a tube furnace 13 whose shape matches that of the reactor, and the tube furnace 13 is divided into two halves, which are spliced together by a chain and a lock catch.

Specifically, the specific connection methods of various devices are as follows:

The outlet of the electric booster 1 is connected with the inlet of the pneumatic booster 2, a stop valve V1 is arranged in the middle, the outlet of the pneumatic booster 2 is connected with the inlet of the gas mass flowmeter 3, and a regulating valve V3 is arranged in the middle; The liquid oxidant or liquid to be treated is stored in a liquid storage tank 14, the outlet of which is connected with the inlet of pump 15, the outlet of gas mass flowmeter 3 is connected with pump 15 through a four-way valve, a one-way valve V5 and a pressure detector are arranged between the four-way valve and pump 15, the outlet of the gas mass flowmeter 3 is connected with the pump IS through a four-way valve and then connected with the inlet of the inner pipe of the heat exchanger 16, the outlet of the inner pipe of the heat exchanger 16 is connected with the inlet of the preheater 17; The liquid to be treated is stored in the liquid storage tank 118, the outlet of the liquid storage tank 118 is connected with the inlet of the pump 119, the outlet of the pump 119 is connected with the inlet of the inner pipe of the heat exchanger I110; A one-way valve V7 and a pressure detector are arranged between the pump 119 and the heat exchanger I110, the inner pipe outlet of the preheater 17 and the inner pipe outlet of the preheater I111 converge and are connected with the inlet of the reactor 12; The outlet of reactor 12 is connected with the inlet of corrosion experiment device 14, the outlet of corrosion experiment device 14 is connected with the inlets of outer pipes of heat exchanger 16 and I110; The outlet of outer pipe of heat exchanger I110 is connected with the inlet of cooler 16, and the outlet of cooler 16 is connected with the inlet of gas-liquid separator 17; A back pressure valve V10 and a pressure detector are arranged between the cooler 16 and the gas-liquid separator 17, a sampling pipe is connected between the back pressure valve V10 and the gas-liquid separator 17 through a three-way connection, and a stop valve V11 is arranged on the sampling pipe; The gas outlet of gas-liquid separator 17 is connected with the inlet of oxygen concentration analyzer 18, the outlet of oxygen concentration analyzer 18 is connected with the inlet of gas flowmeter 19, the outlet of gas flowmeter 19 is connected with the off-gas collection device 20, and the liquid outlet of gas-liquid separator 17 is connected with effluent collection device 21.

Embodiment 2

The method for using the multifunctional continuous hydrothermal oxidation experiment system described in Embodiment 1 includes the following steps:

Commissioning and opening the material pipeline: close V1, V2, V3, V4, V5, V6, V8 and V9, open V7 and V11, and adjust the pressure of the back pressure valve V10 to 0 MPa. Firstly, fill the solution storage tank II with clear water, start the material pump II, and turn on the preheater II, after water comes out of V11, close V11, adjust the pressure of the backpressure valve V10 to the experiment pressure, turn on the tubular furnace wrapping the reactor, and replace the solution in the solution storage tank II with the solution to be treated.

Opening the oxidant pipeline: If the oxidant is gas, open V1, V3 and V4, turn on the electric booster, pneumatic booster, preheater I and preheater II, adjust the inlet air flow, record the readings of gas flowmeter and oxygen concentration analyzer after the reaction is stable, and open V11 for continuous sampling for detection. If the oxidant is liquid, fill the solution storage tank I with liquid oxidant, turn on the material pump I, preheater I, and preheater I; when the reaction is stable, record the readings of the gas flowmeter and oxygen concentration analyzer, and open V11 to continuous sample for detection.

After the reaction, replace the solution in solution storage tank I and solution storage tank II with clear water, turn on the material pump I and material pump II, and close preheater I, preheater II and tube furnace; when the temperature in the reactor is lower than 100° C., adjust the pressure of back pressure valve to 0 MPa; when the temperature drops below 70° C., turn on electric booster and pneumatic booster, open V11 and wait 10 minutes after the outlet water of V11 is clear water, turn off the material pump I, material pump II, when V11 has no outlet water, continue to blow and suck with air for 10 minutes, turn off the electric booster and pneumatic booster, and when the reactor cools to room temperature, turn on the reactor and the corrosion experiment device, and remove the internal catalyst and corroded plate. The liquid oxidant for use includes hydrogen peroxide, potassium nitrate, sodium nitrate solution etc. In addition, in step (2), when the air oxidant delivery pipe or the oxygen delivery pipe is selectively opened, the liquid oxidant can be mixed with the liquid to be treated and then introduced from the material pipeline, so as to realize reaction with simultaneous presence of gas and liquid oxidants.

Specific application of the experiment system described in Embodiment 1.

Case 1: Treatment of methanol solution under the wet oxidation condition with air as oxidant at 250° C. and 8 MPa;

Close V1, V2, V3, V4, V5, V6, V8 and V9, open V7 and V11, and adjust the pressure of the back pressure valve V10 to 0 MPa, fill the solution storage tank II with clear water, turn on the material pump II, and adjust the water inlet rate of the material pump II to 5 mL/min. Turn on the preheater II, set the temperature of the preheater II to 250° C., close V11 after water comes out of V11, adjust the pressure of back pressure valve V10 to 8 MPa, turn on the tube furnace wrapping the reactor, and set the temperature of tube furnace to 250° C. Replace the solution in solution storage tank II with methanol solution, adjust the water inlet rate of material pump II to 8 mL/min after water entering for 15 minutes, open V1, V3 and V4, turn on the electric booster, pneumatic booster, preheater I and preheater II and set the temperature to 250° C., adjust the inlet flow rate to make the theoretical oxidation coefficient between 1.1 and 1.3; when the reaction is stable, record the readings of gas flowmeter 19 and oxygen concentration analyzer 18, and open V11 to continuous sample for detection.

After the reaction, replace the solution in the solution storage tank I and solution storage tank II with clear water, turn on the material pump I, material pump II, close preheater I, preheater II and tube furnace, when the temperature in the reactor is lower than 100° C., adjust the pressure of back pressure valve to 0 MPa, when the temperature drops below 70° C., turn on the electric booster and pneumatic booster, open V11, and wait 10 minutes after the outlet water at V11 is clear water; when there is no water comes out of V11, continue to blow and suck with air for 10 minutes, turn off the electric booster and pneumatic booster, and when the reactor is cooled to room temperature, open the reactor and corrosion experiment device and remove the internal catalyst and corroded plate.

Case 2: Treatment of methanol solution under supercritical water oxidation condition with air as the oxidant at 450° C., 25 MPa:

Set the temperature of preheater II to 450° C., the temperature of tube furnace to 450° C., the temperature of preheater I to 450° C., and adjust the pressure of back pressure valve to 25 MPa. Other operations are the same as those in Case 1.

Case 3: Treatment of methanol solution under wet oxidation condition with oxygen as the oxidant at 250° C., 8 MPa:

Close V1, V2, V3, V4, V5, V6, V8 and V9, open V7 and V11, and adjust the pressure of the back pressure valve V10 to 0 Mpa. First, fill the solution storage tank II with clear water, turn on the material pump II and adjust the water inlet rate of the material pump II to 100 mL/min. Turn on the preheater II, set the temperature of the preheater II to 250° C., after water comes out of V11, adjust the pressure of back pressure valve to 8 MPa, and turn on the tube furnace wrapping the reactor, and set the temperature of the tube furnace to 250° C. Replace the solution in solution storage tank II with methanol solution, adjust the water inlet rate of material pump II to 30 mL/min after water entering for 15 minutes, open V2, V3 and V4, turn on pneumatic booster and preheater I, set the temperature of preheater I to 250° C., adjust the inlet air flow rate to make the theoretical oxidation coefficient between 1.1 and 1.3, record the readings of gas flowmeter and oxygen concentration analyzer after the reaction is stable, and open V11 to continuous sample for detection.

Case 4: Treatment of methanol solution under wet oxidation condition with hydrogen peroxide as the oxidant at 250° C., 8 MPa;

Close V1, V2, V3, V4, V5, V6, V8 and V9, open V5, V7 and V11, and adjust the pressure of the back pressure valve V10 to 0 Mpa. First, fill the solution storage tanks I and II with clear water, turn on the material pumps I and II, and adjust the water inlet rates of the material pumps I and II to 50 mL/min. Turn on preheater I and preheater II, set the temperature of preheater I and preheater II to 250° C., close V11 after water comes out of V11, adjust the pressure of back pressure valve to 8 MPa, turn on the tube furnace wrapping the reactor, and set the temperature of tube furnace to 250° C. Replace the solution in solution storage tank I with 30% hydrogen peroxide, replace the solution in solution storage tank II with methanol solution, adjust the rate of material pump I to 10 ml/min and water inlet rate of material pump II to 15 mL/min after water inlet for 15 minutes, turn on preheater I and preheater II, and set the temperatures of preheater I and preheater II to 250° C.; when the reaction is stable, record the readings of gas flowmeter and oxygen concentration analyzer, and turn on V11 to continuous sample for detecting.

Case 5: Treatment of methanol solution under catalytic wet oxidation condition with air as the oxidant at 250° C. and 8 MPa, and the catalyst is $CuO/TiO_{2-\gamma} Al_2O_3$:

Turn on the tube furnace wrapping the reaction, and fill $CuO/TiO_{2-\gamma} Al_2O_3$ catalyst into the catalyst loading device inside the reactor. The subsequent steps are the same as those in Case 1.

Case 6: Exploring the corrosion performance of 316 stainless steel pressure-bearing tube in the process of treating methanol solution under catalytic wet oxidation with air as the oxidant at 250° C. and 8 MPa:

Replace the middle cylindrical tube of the corrosion reaction device with 316 stainless steel pressure-bearing tube, and other experiment steps are the same as those in Case 1.

Case 7: Exploring the corrosion performance of 316 stainless steel non-pressure-bearing plate in the same direction as water flow in the process of treating methanol solution under catalytic wet oxidation with air as the oxidant at 250° C. and 8 MPa:

Replace the middle cylindrical tube of the corrosion experiment device with a nickel-based alloy tube with a length less than 80 mm, and place an inner diameter of 70 mm, and a 316 stainless steel plate with a length less than 80 mm and a width less than 70 mm inside the tube. The subsequent steps are the same as those in Case 1.

Case 8: Exploring the corrosion performance of 316 stainless steel non-pressure-bearing plate at an angle of 30° with the water flow in the process of treating methanol solution under catalytic wet oxidation with air as the oxidant at 250° C. and 8 MPa:

Arrange a 316 stainless steel plate with a length of 100 mm and a width of 36 mm inside the corrosion experiment device, and tighten the upper and lower covers. Other experiment steps are the same as those in Case 7.

Case 9: Exploring the corrosion performance of 316 stainless steel non-pressure-bearing plate at an angle of 45° with the water flow in the process of treating methanol solution under catalytic wet oxidation with air as the oxidant at 250° C. and 8 MPa:

Arrange a 316 stainless steel plate with a length of 85 mm and a width of 36 mm inside the corrosion experiment device, and place a polished casing with an outer diameter of slightly less than 70 mm, a tube wall thickness of 5 mm and a length of 20 mm above it, and tighten the upper and lower covers. Other experiment steps are the same as those in Case 7.

Case 10: Exploring the corrosion performance of 316 stainless steel non-pressure-bearing plate at an angle of 45° with the water flow in the process of treating methanol solution under catalytic wet oxidation with air as the oxidant at 250° C. and 8 MPa:

Arrange a 316 stainless steel plate with a length of 67 mm and a width of 36 mm inside the corrosion experiment device, and place a polished casing with an outer diameter of slightly less than 70 mm, a tube wall thickness of 5 mm and a length of 50 mm above it, and tighten the upper and lower covers. Other experiment steps are the same as those in Case 7.

What is claimed is:

1. A method for applying a multifunctional continuous hydrothermal oxidation experiment system, wherein the multifunctional continuous hydrothermal oxidation experiment system, comprising a reactor, wherein an oxidant pipeline and a material pipeline are connected in parallel at an inlet of the reactor;
   the oxidant pipeline comprises gas oxidant delivery pipes and liquid oxidant delivery pipes which are connected in parallel, the gas oxidant delivery pipes comprise an air oxidant delivery pipe and an oxygen delivery pipe which are connected in parallel;
   a first heat exchanger is connected to a first preheater, a second heat exchanger is connected to a second preheater; the first and second preheaters are connected on the oxidant pipeline and the material pipeline, respectively, the oxidant pipeline and the material pipeline are communicated with inner pipes of the first and second heat exchangers, respectively, and the outlet of the reactor is sequentially communicated with a corrosion experiment device, an outer pipe of the heat exchanger, a cooler and a gas-liquid separator is connected to downstream components of the reactor and covers the outer pipe of the first and second heat exchangers by a tube;
   a back pressure valve and a sampling valve are connected in series between the cooler and the gas-liquid separator;
   a gas outlet of the gas-liquid separator is connected in series with an oxygen concentration analyzer, a gas flowmeter and an off-gas collection device in sequence; a liquid outlet of the gas-liquid separator is connected with an effluent collection device;
   the method comprising the following steps:
   (1) Commissioning and opening material pipelines: close the oxidant pipeline before the heat exchanger, adjust the pressure of the back pressure valve to 0 MPa, open the material pipeline to introduce clear water, close the sampling valve after water comes out of it, adjust the pressure of the material pipeline to an experiment pressure through the back pressure valve, open the reactor and introduce the solution to be treated;
   (2) Opening oxidant pipelines: according to the type of experiment oxidant, choose to open the air oxidant delivery pipe, oxygen delivery pipe or liquid oxidant delivery pipe, after the reaction is stable, record the readings of gas flowmeter and oxygen concentration analyzer, open the sampling valve and continuously sample for detection;
   (3) After the reaction, introducing clear water from the material pipeline and liquid oxidant pipeline, and turning off the preheater and the reactor, adjusting the pressure of the back pressure valve to 0 MPa when the temperature in the reactor is lower than 100° C., and opening the gas oxidant pipeline and the sampling valve when the temperature drops below 70° C., stopping introducing clear water after the outlet water of the sampling valve is clear water, continuing to blow and suck with gas for a while and close the gas oxidant pipeline after the reactor cools down to room temperature, opening the reactor and the corrosion experiment device, and removing an internal catalyst and corroded plate.

2. The method for applying the multifunctional continuous hydrothermal oxidation experiment system according to claim 1, wherein in step (2), when the air oxidant delivery pipe or the oxygen delivery pipe is selected to be opened, the liquid oxidant can be mixed with the liquid to be treated and then introduced from the material pipeline, so as to realize reaction with simultaneous presence of gas and liquid oxidants.

3. The method for applying the multifunctional continuous hydrothermal oxidation experiment system according to claim 1, wherein the liquid oxidant is hydrogen peroxide, potassium nitrate or sodium nitrate solution.

4. The method for applying the multifunctional continuous hydrothermal oxidation experiment system according to claim 1, wherein a pneumatic booster and a gas mass flowmeter are sequentially connected in series on the gas oxidant delivery pipe, and an electric booster and an oxygen cylinder for introducing oxygen are connected in parallel at an inlet of the pneumatic booster through the air delivery pipe and the oxygen delivery pipe, respectively.

5. The method for applying the multifunctional continuous hydrothermal oxidation experiment system according to claim 1, wherein a first liquid storage tank is connected with a first pump, a second liquid storage tank is connected with a second pump; the first and second pumps are connected to the liquid oxidant delivery pipe and the material delivery pipe, respectively.

6. The method for applying the multifunctional continuous hydrothermal oxidation experiment system according to claim 1, wherein the oxidant and materials enter into the reactor through a perforated pipe, and a catalyst loading device is arranged in the reactor; a heating device outside the reactor is a tube furnace.

7. The method for applying the multifunctional continuous hydrothermal oxidation experiment system according to claim 1, wherein the corrosion experiment device is detachable and consists of an upper cover, a lower cover, and a middle cylindrical tube, and a plate to be tested is fixed in the middle cylindrical tube at an angle of 0°-90° with a water flow direction, so as to simulate the corrosion of the plate at different angles with a water flow.

8. The method for applying the multifunctional continuous hydrothermal oxidation experiment system according to claim 1, wherein the cooler is a cold shower.

\* \* \* \* \*